Feb. 8, 1944.     A. P. WOOD     2,341,304
BRUSH HOLDER
Filed Nov. 23, 1942

Inventor:
Alexander P. Wood,
by Harry E. Dunham
His Attorney.

Patented Feb. 8, 1944

2,341,304

JUN 13 1944

UNITED STATES PATENT OFFICE 2,341,304

BRUSH HOLDER

Alexander P. Wood, Schenectady, N. Y., assignor to General Electric Company, a corporation of New York Application November 23, 1942, Serial No. 466,595

8 Claims. (Cl. 171—324)

My invention relates to brush holders such as are used with dynamo-electric machines.

An object of my invention is to provide a shock-proof brush holder arranged to indicate the force exerted by this brush biasing device in biasing a brush against a current collecting device of a machine in which the brush is employed.

Another object of my invention is to provide an improved brush holder in which a resilient retaining element is arranged to minimize accidental changing of the position of the pressure plate due to transient shocks.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 1:
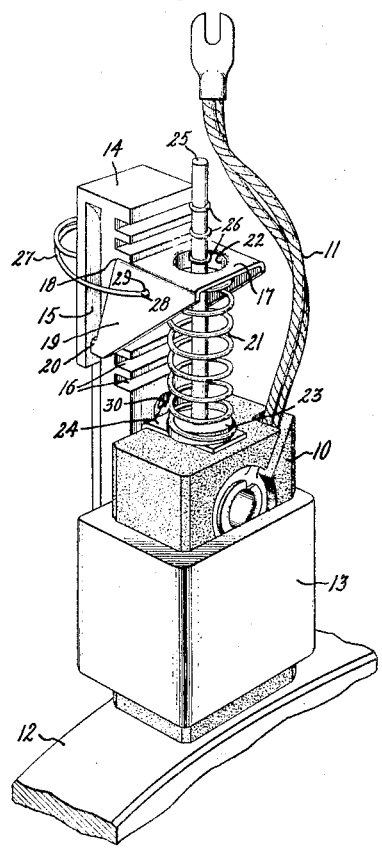
Figure 2:
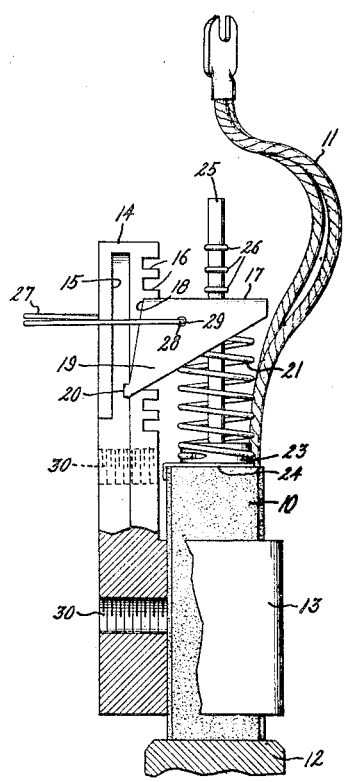
Figure 3:
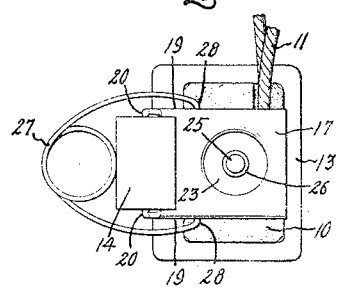

In the drawing, Fig. 1 is a perspective view of a brush holder embodying my invention; Fig. 2 is a side view of the brush and brush holder shown in Fig. 1; and Fig. 3 is a plan view of the brush holder shown in Figs. 1 and 2.

In the accompanying drawing, I have shown an embodiment of my invention applied to a specific form of brush holder described and claimed in Patent 1,693,319, Simmons, November 27, 1928, assigned to the assignee of this application. It will be readily understood that the principle of my invention is applicable to brush holders of any convenient form which can be used in connection with current collecting devices, such as commutators and slip rings of dynamo-electric machines.

Referring to the drawing, I have shown an electrical contact brush 10 having a conventional pigtail conductor lead 11 for connecting the brush in the circuit of the machine in which it is to be used. This brush 10 is arranged in contact with a current collecting slip ring device 12 and is supported by a brush holder having a brush guide member 13 for guiding the brush toward the slip ring. The brush holder is provided with an arrangement for biasing the brush against the current collecting device which comprises a supporting stem 14 having longitudinally extending guideway grooves 15 in the sides thereof and a plurality of slots 16 extending transversely in one of the longitudinal faces of the stem 14 and arranged to cooperate with a pressure plate 17 having a locating edge 18 adapted to fit into the stem slots 16. The pressure plate 17 is provided with a pair of downwardly extending guiding fingers 19 having fulcrum elements 20 formed on the lower ends thereof adapted to extend into the stem guideway grooves 15. The brush 10 is biased towards the slip ring 12 by a resilient compression coil spring 21 arranged about a spring seat formed by cylindrical flange 22 on the lower side of the pressure plate 17 and a spring seat formed on a pressure tip element 23 in engagement with a contact clip 24 secured to the upper surface of the brush 10. The compression spring 21 biases the brush 10 away from the pressure plate 17 and also biases the pressure plate 17 upwardly and tends to pivot it about the pressure plate fulcrums 20, such that the pressure plate locating edge 18 is resiliently biased into a stem slot 16 and the fulcrums 20 are resiliently biased against the sides of the guideway grooves 15 adjacent the spring 21. This produces a wedging action on the pressure plate 17 which tends to retain it in position. It is desirable that the pressure on the brush 10 should be readily determinable without the use of special force measuring devices, and this is readily determinable in the illustrated arrangement by the provision of a pressure indicating pin 25 which is secured to the pressure tip 23 and extends parallel to the brush 10 and through an opening formed through the pressure plate 17 and the cylindrical flange 22. This pin 25 is formed with a plurality of spaced apart graduation markings 26 which indicate the total pressure of the spring 21 on the brush 10. The springs 21 are formed to exert a predetermined pressure for a predetermined amount of compression, and this compression is dependent upon the axial length of the spring 21. For a given graduation mark 26 in registry with the top of the pressure plate 17, a predetermined pressure is exerted on the brush 10 by the spring 21. Thus, the pressure plate 17 may be moved relative to the brush 10 into engagement with various slots 16 in the brush holder stem 14 to provide the desired pressure on the brush 10. Furthermore, as the brush 10 wears, it becomes necessary to move the pressure plate 17 somewhat nearer the brush guiding member 13 to maintain substantially uniform pressure on the brush throughout its useful life. It has been found that under certain conditions of transient vibrations and shocks, there may be a temporary reduction in the biasing pressure of the spring 21 against the pressure plate 17, or this pressure may be insufficient to maintain the locating edge 18 of the pressure plate 17 in position in the desired slot 16 of the brush holder stem 14, and the pressure plate 17 may become dislodged from its predetermined desired position, with the result that the pressure on the brush 10 may be lost and poor contact result between the brush 10 and the current collecting slip ring device 12. In order to prevent such dislodgment, a resilient coil retaining spring 27 is arranged with a loop of the spring in longitudinally slidable engagement with the back face of the brush holder stem 14, and the sides of this spring extend around the stem 14 with inturned ends 28 thereof extending through openings 29 formed in the guiding fingers 19 of the pressure plate 17, thereby securing the ends of the spring to the pressure plate. This spring resiliently and firmly biases the locating edge 18 of the pressure plate 17 into engagement with a slot 16 of the brush holder stem 14 and minimizes dislodgement of the pressure plate which might result from the transient conditions mentioned above without interfering with the normal operation of the brush holder or the operation of the pressure adjusting feature thereof. Obviously, other types of biasing springs might be used, and the spring shown in the drawing is illustrative of the preferred embodiment of this feature with the type brush holder illustrated. The brush holder is adapted to be secured to a supporting yoke or other suitable insulating frame or bushing by screws adapted to engage threaded openings 30 formed in the brush holder stem 14.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States, is:

1. A brush holder having a brush guiding member, a stem extending from said guiding member, a plurality of slots extending transversely in said stem, a pressure plate adapted to fit into said stem slots, resilient means for biasing a brush through said guiding member and biasing said pressure plate into one of said stem slots for holding said pressure plate in a predetermined position to provide a predetermined pressure on the brush, and resilient means connected to said pressure plate and engaging said stem for resiliently holding said pressure plate in position in said stem groove to minimize dislodgement of said pressure plate due to transient shocks and reductions in biasing spring pressure on said pressure plate.

2. A brush holder having a brush guiding member, a stem extending from said guiding member, a plurality of slots extending transversely in said stem, a pressure plate adapted to fit into said stem slots, resilient means for biasing a brush through said guiding member and biasing said pressure plate into one of said stem slots for holding said pressure plate in a predetermined position to provide substantially a predetermined pressure on the brush, and means secured to said pressure plate and longitudinally slidably engaging said stem for resiliently holding said pressure plate in position against said stem to minimize dislodgement of said pressure plate due to transient shocks and reductions in biasing spring pressure on said pressure plate.

3. A brush holder having a brush guiding member, a stem extending from said guiding member, a plurality of slots extending transversely in said stem, a pressure plate adapted to fit into said stem slots, resilient means for biasing a brush through said guiding member and biasing said pressure plate into one of said stem slots for holding said pressure plate in a predetermined position to provide substantially a predetermined pressure on the brush, and means including a coil retaining spring secured to said pressure plate and extending around said stem for resiliently holding said pressure plate in position in said stem groove to minimize dislodgement of said pressure plate due to transient shocks and reductions in biasing spring pressure on said pressure plate.

4. A brush holder having a brush guiding member, a stem extending from said guiding member, a guideway groove extending longitudinally in said stem, a plurality of slots extending transversely in said stem, a pressure plate adapted to fit into said stem slots and having a fulcrum element adapted to extend into said stem guideway groove, resilient means for biasing a brush through said guiding member and biasing said pressure plate into one of said stem slots and said fulcrum element against a side of said stem groove, and means secured to said pressure plate for resiliently holding said pressure plate in position in said stem groove to minimize dislodgement of said pressure plate due to transient shocks and reductions in biasing spring pressure on said pressure plate.

5. A brush holder having a brush guiding member, a stem extending from said guiding member, a guideway groove extending longitudinally in said stem, a plurality of slots extending transversely in said stem, a pressure plate having a locating edge thereof adapted to fit into said stem slots and having a guiding finger provided with a fulcrum element adapted to extend into said stem guideway groove, resilient means for biasing a brush through said guiding member and biasing said pressure plate locating edge into one of said stem slots and said fulcrum element against a side of said stem groove for holding said pressure plate in a predetermined position to provide substantially a predetermined pressure on the brush, and resilient means secured to said pressure plate and extending around said stem for resiliently holding said pressure plate in position against said stem to minimize dislodgement of said pressure plate due to transient shocks and reductions in biasing spring pressure on said pressure plate.

6. A brush holder having a brush guiding member, a stem extending from said guiding member, a guideway groove extending longitudinally in said stem, a plurality of slots extending transversely in said stem, a pressure plate having a locating edge thereof adapted to fit into said stem slots and having a guiding finger provided with a fulcrum element adapted to extend into said stem guideway groove, resilient means for biasing a brush through said guiding member and biasing said pressure plate locating edge into one of said stem slots and said fulcrum element against a side of said stem groove for holding said pressure plate in a predetermined position to provide substantially a predetermined pressure on the brush, and means secured to said pressure plate and longitudinally slidably engaging said stem for resiliently holding said pressure plate in position against said stem to minimize dislodgement of said pressure plate due to transient shocks and reductions in biasing spring pressure on said pressure plate.

7. A brush holder having a brush guiding member, a stem extending from said guiding member, a guideway groove extending longitudinally in said stem, a plurality of slots extending transversely in said stem, a pressure plate having a locating edge thereof adapted to fit into said stem slots and having a guiding finger provided with a fulcrum element adapted to extend into said stem guideway groove, resilient means for biasing a brush through said guiding member and biasing said pressure plate locating edge into one of said stem slots and said fulcrum element against a side of said stem groove for holding said pressure plate in a predetermined position to provide substantially a predetermined pressure on the brush, and means including a coil retaining spring secured to said pressure plate and extending around said stem for resiliently holding said pressure plate in position against said stem to minimize dislodgement of said pressure plate due to transient shocks and reductions in biasing spring pressure on said pressure plate.

8. A brush holder having a brush guiding member, a stem extending from said guiding member, a guideway groove extending longitudinally in said stem, a plurality of slots extending transversely in said stem, a pressure plate having a locating edge thereof adapted to fit into said stem slots and having a guiding finger provided with a fulcrum element adapted to extend into said stem guideway groove, resilient means including a coil spring adapted to be compressed between said pressure plate and a brush in said guiding member for biasing the brush through said guiding member and biasing said pressure plate locating edge into one of said stem slots and said fulcrum element against a side of said stem groove for holding said pressure plate in a predetermined position to provide substantially a predetermined pressure on the brush, and means including a coil retaining spring secured to said pressure plate and extending around said stem for resiliently holding said pressure plate in position against said stem to minimize dislodgement of said pressure plate due to transient shocks and reductions in biasing spring pressure on said pressure plate.

ALEXANDER P. WOOD.